Aug. 20, 1968 J. M. BUDD, JR 3,398,354

VOLTAGE CONTROL APPARATUS

Filed Dec. 23, 1964 2 Sheets-Sheet 1

INVENTOR.
JOHN M. BUDD JR.

BY Roger W. Jensen
ATTORNEY

Aug. 20, 1968 J. M. BUDD, JR 3,398,354

VOLTAGE CONTROL APPARATUS

Filed Dec. 23, 1964 2 Sheets-Sheet 2

INVENTOR.
JOHN M. BUDD JR.

BY Roger W. Jensen

ATTORNEY

United States Patent Office 3,398,354
Patented Aug. 20, 1968

3,398,354

VOLTAGE CONTROL APPARATUS

John M. Budd, Jr., Edina, Minn., assignor to Honeywell Inc., a corporation of Delaware Filed Dec. 23, 1964, Ser. No. 420,612
8 Claims. (Cl. 323—6)

ABSTRACT OF THE DISCLOSURE

A circuit which produces a regulated output voltage by sensing the output voltage and utilizing the signal against a reference to adjust the frequency of a variable frequency oscillator whose output is applied through a transformer to a secondary winding in series with the source voltage between the output terminals.

The present invention pertains to Control Apparatus and more particularly it pertains to an apparatus for controlling the amplitude of AC voltage. The AC voltage regulator described herein utilizes the frequency of the supply voltage as a reference and a voltage controlled variable frequency oscillator as a phase controlled oscillator to obtain an essentially zero output resistance regulator with nearly perfect regulation.

The regulation of the voltage amplitude of the signal is obtained by adding to the AC voltage signal a second signal of the same frequency and of substantially constant amplitude. The phase angle between the two signals is a variable which is controlled in such a way that, as the supply voltage varies, the sum of the two signals is always of constant amplitude. An amplitude detector is provided to detect variations in the amplitude of the regulated voltage output and a voltage controlled variable frequency oscillator is provided to receive a signal from the amplitude detector and to provide an output signal whose frequency is proportional to the amplitude of the regulated voltage output. The variable frequency oscillator provides an output signal of substantially constant amplitude and of a frequency which is substantially equal to the frequency of the supply signal. This signal is added to the supply voltage signal and their phasor sum results in the output signal of the regulator.

If the supply voltage increases, the output voltage of the regulator also tends to increase. The increase is sensed by the amplitude detector, providing an increased DC voltage to the magnetic oscillator. This in turn causes the frequency of the magnetic oscillator output signal to slightly increase. As a result the signal from the oscillator temporarily leads the supply signal, causing the vector sum of the two signals to decrease, thereby decreasing the output signal of the regulator. If the frequency of the magnetic oscillator was exactly equal to that of the supply signal before the increase in magnitude of the supply signal, then there would be a difference in the two frequencies after the supply voltage increases. This frequency difference may be thought of as a rate of change of phase difference between the supply voltage and the output of the variable frequency oscillator. The rate of change of phase is in such a direction as to decrease the phasor sum of the two signals, thus reducing the output signal of the regulator. The decrease in the output signal will reduce the frequency of the oscillator and make it more nearly equal to the frequency of the supply voltage. The phase will continue to change until the magnitude of the output voltage has returned to its initial value and the frequency of the supply voltage and the oscillator will again be the same.

It is therefore an object of the present invention to provide an improved AC amplitude regulating apparatus.

A further object of this invention is to provide an AC voltage regulator with low output impedance and improved amplitude regulation.

These and further objects will become apparent to those skilled in the art upon examination of the following specification, claims, and drawings in which:

Figure 1:
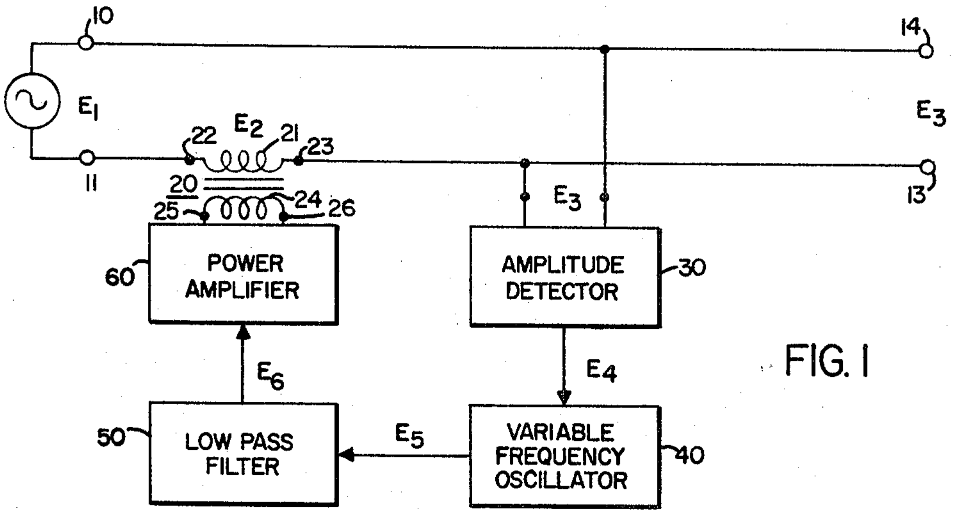
FIGURE 1 is a schematic block diagram of the novel apparatus.

Referring now to FIGURE 1 a pair of input terminals 10 and 11 are provided for connection to a source of AC potential depicted as $E_1$. A pair of output terminals 14 and 13 are also provided where appears the output voltage of the regulator depicted as $E_3$. Input terminal 10 is connected directly to output terminal 14 while input terminal 11 is connected to an end terminal 22 of a secondary winding 21 of a transformer 20. Secondary winding 21 further has an end terminal 23 connected directly to output terminal 13. Transformer 20 also has a primary winding 24 with end terminals 25 and 26.

An amplitude detector 30 has a pair of input terminals connected directly to output terminals 14 and 13. The output of amplitude detector 30 is a control signal depicted as $E_4$, which is proportional to the voltage amplitude of $E_3$. Amplitude detector 30 can be a simple rectification circuit well known in the art. $E_4$ is applied to a variable frequency oscillator 40 whose output is an alternating signal whose frequency varies as a function of the amplitude of $E_4$ applied at the input of oscillator 40. The output signal of oscilaltor 40 depicted as $E_5$ is passed through a low pass filter 50 and applied to the input of a power amplifier 60. The output of power amplifier 60 is applied across the primary winding 24 of transformer 20. The signal from primary winding 24 is inpressed on secondary winding 21 where it is depicted as $E_2$.

The operation of the apparatus shown in FIGURE 1 may be best described with the aid of phase diagrams of FIGURE 2. $E_1$ is the unregulated voltage signal of a substantially constant frequency. $E_3$ is the regulated output and is therefore of substantially constant amplitude and $E_2$ appearing across winding 21 is a signal of substantially constant voltage amplitude whose phase may be controlled with respect to input signal $E_1$.

Figure 2A:
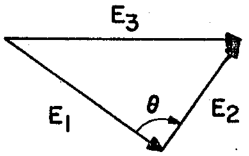
FIGURE 2 illustrates graphically the amplitude and phase relationship of the voltages appearing at various parts of the apparatus when the apparatus is in operation.
Figure 2B:
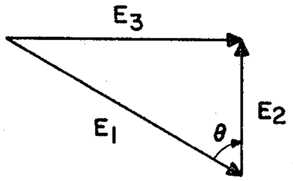

Assume for the moment that the amplitude of $E_1$ is unchanging. The sum of $E_1$ and $E_2$ will produce an $E_3$ of constant amplitude, as desired. As long as the amplitude of $E_1$ does not change the phase between the two does not change either. Assume that the sitaution just described is illustrated by FIGURE 2B.

If now $E_1$ suddenly decreases it will tend to produce a similar decrease in $E_3$. The change in $E_3$ is immediately detected by amplitude detector 30 resulting in a decreases in control signal $E_4$. The decrease in amplitude of $E_4$ in turn has the effect of reducing the frequency of oscillator 40, thereby decreasing the frequency of signal $E_5$. The same decrease in frequency therefore occurs in $E_6$ and also in $E_2$. The frequency of $E_2$ is now slightly less than the frequency of $E_1$. This frequency difference may be thought of as a rate of change of phase difference between $E_1$ and $E_2$. The rate of change of phase is in such a direction as to increase phase angle $\theta$ as illustrated in FIGURE 2A. This increases the phasor sum of $E_1$ and $E_2$ resulting in an increased $E_3$. As $E_3$ increases $E_4$ will increase thus increasing the frequency of oscillator 40 and reducing the frequency difference between $E_1$ and $E_2$. The phase will continue to change until the magnitude of $E_3$ has returned to its initial value and the frequency of $E_2$ and $E_1$ will again be the same.

Figure 2C:
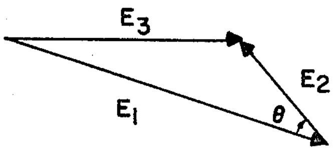

An increase in $E_1$ will result in a tendency of $E_3$ to increase. This increase in $E_3$ will produce a corresponding increase in $E_4$ and produce an increase in the frequency of oscillator 40. Thus the frequency of $E_2$ will momentarily exceed the frequency of $E_1$ and a rate of change of phase between $E_1$ and $E_2$ will be in a direction which will reduce angle $\theta$ such as illustrated in FIGURE 2C. This will result in a reduction in the vector sum of $E_1$ and $E_2$ and thus in a reduction of the magnitude of $E_3$. As $E_3$ decreases, $E_4$ will correspondingly decrease and reduce the frequency of oscilaltor 40. The phase will continue to change until the magnitude of $E_3$ will have returned to its initial value and the frequency of $E_2$ and $E_1$ will again be the same.

Various types of amplitude detectors are known in the art, many of which could be used in the present apparatus. It may be a simple rectification circuit such that its output $E_4$ is a DC signal whose amplitude is proportional to the amplitude $E_3$.

Variable frequency oscillator 40 may be one of many oscillators known in prior art in which the frequency may be varied as a function of a voltage input. In the successful embodiment of this invention a magnetic oscillator such as shown in FIGURE 3 has been used.

Figure 3:
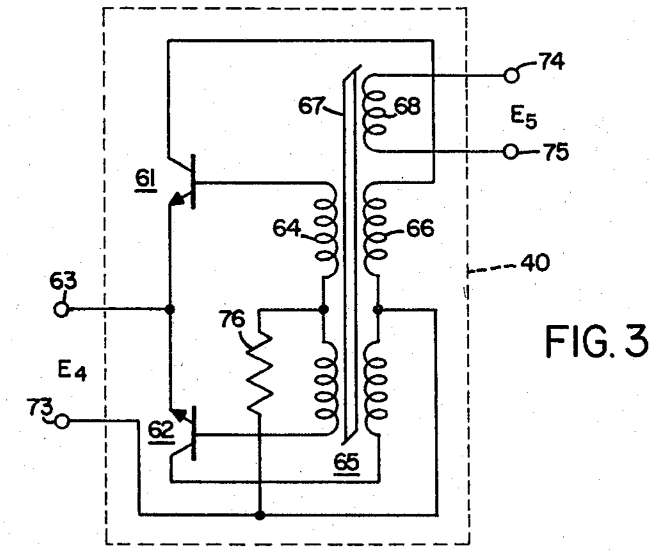
FIGURE 3 is one possible embodiment of variable frequency oscillator for use in the apparatus of FIGURE 1.

In FIGURE 3 magnetic oscillator 40 has a pair of input terminals 63 and 73, and a pair of output terminals 74 and 75. The oscillator has a pair of transistors 61 and 62, each of which has a collector, an emitter, and a base electrode. The emitter electrodes of the two transistors are connected together and to input terminal 63 which is adapted to receive signal $E_4$ from amplitude detector 30 of FIGURE 1. The base electrodes of transistors 61 and 62 are connected to the opposing ends of a feedback winding 64 of a transformer 65. Transformer 65 further has a second winding 66, the opposing ends of which are connected to the collector electrodes of transistors 61 and 62, respectively. Transformer 65 further has an output winding 68 whose ends are connected between output terminals 74 and 75. Transformer 65 has a saturable core 67. Windings 64 and 66 each have a centrally located intermediate tap. Intermediate tap of winding 66 is connected to input terminal 73 and also to the intermediate tape of winding 64 through a resistor 76. $E_5$ appears across the secondary winding 68 between output terminals 74 and 75.

The output of the magnetic oscillator is a square wave signal $E_5$ whose frequency is related to $E_4$ as follows:

$$F=E_4/4N\phi_m$$

where $F$=frequency of $E_5$ $N$=number of active oscillator turns $\phi_m$=maximum (saturation) oscillator core flux If $E_1$ is a sinusoidal signal then it is necessary that $E_2$ be also a sine wave. For that reason, filter 50 is provided to eliminate all but the fundamental frequency component of $E_5$. It is understood, however, that $E_1$ and $E_2$ need not be of sinusoidal form. They could, for example, be square waves or whatever the particular case may require.

Figure 4:
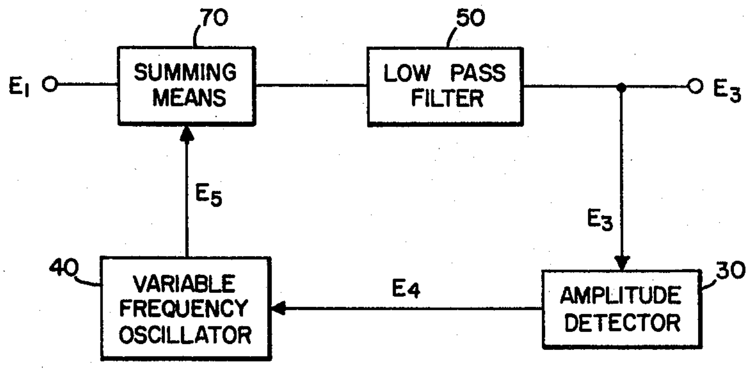
FIGURE 4 is a schematic block diagram of an alternate embodiment of the present invention.

FIGURE 4 illustrates another embodiment of the present invention. Whereas in FIGURE 1 the signal from variable frequency oscillator 40 is passed through a low pass filter 50 before the signal is added to $E_1$, in the apparatus of FIGURE 4 the summing is accomplished first and the resulting signal is passed through low pass filter 50 before it is applied to the output terminals 13 and 14. Aside from this modification, the operation of the apparatus of FIGURE 4 is the same as that of FIGURE 1.

Many variations and embodiments are possible within the spirit of this invention. It is, therefore, understood that the specific embodiment of my invention shown here is for the purpose of illustration only, and that my invention is limited only by the scope of the appended claims.

I claim:

1. Voltage amplitude regulating apparatus comprising:
a source of unregulated alternating potential;
a summing means having a pair of inputs and an output;
amplitude detection means connected to the output of said summing means, said detection means providing an output signal proportional to the amplitude of the signal at said output of said summing means;
a variable frequency oscillator means connected to receive the output signal from said amplitude detection means and adapted to provide an output signal whose frequency varies as a function of the signal received by the oscillator; and
means connecting the output of said oscillator to one input of said summing means and connecting the other input of said summing means to said source.

2. Voltage amplitude regulating apparatus comprising:
a source of unregulated alternating potential;
a summing means having a pair of inputs and an output;
amplitude detection means connected to the output of said summing means, said detection means providing an output signal proportional to the amplitude of the signal at said output of said summing means;
a variable frequency oscillator means connected to receive the output signal from said amplitude detection means and adapted to provide an output signal of substantially constant amplitude, but of a frequency which varies as a function of the signal received by the oscillator;
filter means having an input connected to receive the signal from said oscillator means, and having an output; and
means connecting the output of said filter means to one input of said summing means and connecting the other input of said summing means to said source.

3. Voltage amplitude regulating apparatus comprising:
a source of unregulated alternating potential;
a summing means having a first and a second input and an output;
means connecting said first input of said summing means to said source of potential;
filter means having an input connected to said output of said summing means and having an output;
amplitude detection means connected to the output of said filter means, said detection means providing an output signal proportional to the amplitude of the signal at said output of said summing means;
a variable frequency oscillator means connected to receive the output signal from said amplitude detection means and adapted to provide an output signal of substantially constant amplitude, but of a frequency which varies as a function of the signal received by the oscillator;
means connecting the output of said oscillator to the second input of said summing means.

4. Alternating voltage regulating apparatus comprising:
a pair of input terminals for connection to a source of alternating potential;
a pair of output terminals;
a voltage amplitude detection means connected between said output terminals for detecting the amplitude of the voltage and to provide an output signal proportional to the voltage detected;
a variable frequency oscillator connected to receive the signal from said voltage amplitude detection means and to provide an output voltage of substantially constant amplitude, but whose frequency varies as a function of the voltage amplitude between said output terminals;
summing means for adding the output voltage of said oscillator to the source voltage appearing between said pair of input terminals, said summing means being connected to said output terminals to provide between said output terminals the sum of said two voltages.

5. Alternating voltage regulating apparatus comprising:
- a pair of input terminals for connection to a source of alternating potential;
- a pair of output terminals;
- a voltage amplitude detection means connected between said output terminals for detecting the amplitude of the voltage and to provide an output signal proportional to the voltage detected;
- a variable frequency oscillator connected to receive the signal from said voltage amplitude detection means and to provide an output voltage of substantially constant amplitude, but whose frequency varies as a function of the voltage amplitude between said output terminals;
- an amplifier adapted to amplify the signal from said oscillator;
- summing means for adding the output voltage of said amplifier to the source voltage appearing between said pair of input terminals, said summing means being connected to said output terminals to provide between said output terminals the sum of said two voltages.

6. Alternating voltage amplitude regulating apparatus comprising:
- a pair of input terminals for connection to a source of alternating potential;
- a pair of output terminals;
- transformer means having a primary and a secondary winding;
- means connecting said secondary winding between one of said input terminals and one of said output terminals, and connecting the other input terminal to the other output terminal;
- voltage amplitude detection means connected between said output terminals, said detection means providing an output signal proportional to the amplitude of the voltage detected;
- a variable frequency oscillator connected to receive the signal from said voltage amplitude detection means and to provide an output voltage of substantially constant amplitude but whose frequency varies as a function of the voltage amplitude between said output terminals; and
- means connecting the output of said oscillator to the primary winding of said transformer means to impress the output voltage from said oscillator across said primary winding and thereby induce a voltage in said secondary winding.

7. Alternating voltage amplitude regulating apparatus comprising:
- a pair of input terminals for connection to a source of alternating potential;
- a pair of output terminals;
- transformer means having a primary and a secondary winding;
- means connecting said secondary winding between one of said input terminals and one of said output terminals, and connecting the other input terminal to the other output terminal;

- voltage amplitude detection means connected between said output terminals, said detection means providing an output signal proportional to the amplitude of the voltage detected;
- a variable frequency oscillator connected to receive the signal from said voltage amplitude detection means and to provide an output voltage of substantially constant amplitude but whose frequency varies as a function of the voltage amplitude between said output terminals;
- a low pass filter adapted to eliminate all but the fundamental frequency of the signal from said oscillator; and
- means connecting the output of said filter to the primary winding of said transformer means to impress the output voltage from said filter across said primary winding and thereby induce a voltage in said secondary winding.

8. Alternating voltage amplitude regulating apparatus comprising:
- a pair of input terminals for connection to a source of alternating potential;
- a pair of output terminals;
- transformer means having a primary and a secondary winding;
- means connecting said secondary winding between one of said input terminals and one of said output terminals, and connecting the other input terminal to the other output terminal;
- voltage amplitude detection means connected between said output terminals, said detection means providing an output signal proportional to the amplitude of the voltage detected;
- a variable frequency oscillator connected to receive the signal from said voltage amplitude detection means and to provide an output voltage of substantially constant amplitude but whose frequency varies as a function of the voltage amplitude between said output terminals;
- a low pass filter adapted to eliminate all but the fundamental frequency of the signal from said oscillator;
- an amplifier for amplifying the filtered signal from said oscillator; and
- means connecting the output of said amplifier to the primary winding of said transformer means to impress the output voltage from said amplifier across said primary winding and thereby induce a voltage in said secondary winding.

References Cited

UNITED STATES PATENTS

| | | | |
|---|---|---|---|
| 3,293,530 | 12/1966 | Baude | 321 |
| 3,241,049 | 3/1966 | McVey | 323 |
| 3,151,915 | 10/1964 | Graybeal | 307 |
| 2,758,286 | 8/1956 | Wible | 323 |
| 1,893,767 | 1/1933 | FitzGerald et al. | 323 |

ORIS L. RADER, *Primary Examiner.*

H. HUBERFELD, *Assistant Examiner.*